United States Patent
Wang et al.

(10) Patent No.: US 10,817,334 B1
(45) Date of Patent: Oct. 27, 2020

(54) REAL-TIME ANALYSIS OF DATA STREAMING OBJECTS FOR DISTRIBUTED STREAM PROCESSING

(71) Applicant: Twitter, Inc., San Francisco, CA (US)

(72) Inventors: Cong Wang, San Francisco, CA (US); Maosong Fu, San Francisco, CA (US); Karthik Ramasamy, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 161 days.

(21) Appl. No.: 15/921,419

(22) Filed: Mar. 14, 2018

Related U.S. Application Data

(60) Provisional application No. 62/471,337, filed on Mar. 14, 2017.

(51) Int. Cl.
| | | |
|---|---|---|
| *G06F 9/46* | (2006.01) | |
| *G06F 9/48* | (2006.01) | |
| *G06F 9/50* | (2006.01) | |
| *G06F 16/2455* | (2019.01) | |

(52) U.S. Cl.
CPC .......... *G06F 9/4881* (2013.01); *G06F 9/5016* (2013.01); *G06F 16/24568* (2019.01)

(58) Field of Classification Search
CPC ....................................................... G06F 9/52
USPC ....................................................... 718/104
See application file for complete search history.

(56) References Cited

U.S. PATENT DOCUMENTS

| | | | | |
|---|---|---|---|---|
| 9,015,238 B1* | 4/2015 | Anton | .................. | G06F 16/256 709/203 |
| 9,471,585 B1* | 10/2016 | Theimer | ............... | G06F 3/0641 |
| 10,095,547 B1 | 10/2018 | Kulkarni et al. | | |
| 2009/0300615 A1* | 12/2009 | Andrade | ............... | G06F 9/5066 718/100 |
| 2009/0313614 A1* | 12/2009 | Andrade | ................ | G06F 8/451 717/151 |
| 2010/0293301 A1* | 11/2010 | Amini | ..................... | G06F 9/544 710/12 |
| 2010/0293532 A1* | 11/2010 | Andrade | ............. | G06F 11/1438 717/140 |
| 2010/0293535 A1* | 11/2010 | Andrade | ................ | G06F 8/433 717/156 |

(Continued)

OTHER PUBLICATIONS

Abadi et al., "The Design of the Borealis Stream Processing Engine," Proceedings of the 2005 Conference on Innovative Data Systems Research (CIDR), Mar. 2005, 13 pages.

(Continued)

*Primary Examiner* — Mehran Kamran
(74) *Attorney, Agent, or Firm* — Fish & Richardson P.C.

(57) ABSTRACT

Methods, systems, and apparatus, including computer programs encoded on computer storage media, for data stream processing. One method performed by a stream manager in a group of containers including streaming processes and stream managers includes receiving a first data streaming object of the data streaming objects from a first component in the group of containers; determining whether to process the first data streaming object; in response to determining to process the first data streaming object processing the first data streaming object and routing the first data streaming object; and in response to determining not to process the first data streaming object, routing the first data streaming object.

20 Claims, 9 Drawing Sheets

(56) References Cited

U.S. PATENT DOCUMENTS

| | | | |
|---|---|---|---|
| 2011/0010581 A1* | 1/2011 | Tanttu | G06F 9/5038 714/11 |
| 2011/0231447 A1* | 9/2011 | Starkey | G06F 16/27 707/792 |
| 2011/0302318 A1* | 12/2011 | Birger | H04L 12/2838 709/231 |
| 2012/0331333 A1* | 12/2012 | Imaki | G06F 11/1658 714/2 |
| 2014/0280766 A1* | 9/2014 | Banerjee | H04L 65/60 709/219 |
| 2015/0103837 A1* | 4/2015 | Dutta | H04L 47/125 370/401 |
| 2015/0120224 A1* | 4/2015 | Siebel | G01R 21/00 702/61 |
| 2015/0135255 A1* | 5/2015 | Theimer | H04L 63/20 726/1 |
| 2016/0098662 A1* | 4/2016 | Voss | G06Q 10/06316 705/7.26 |
| 2016/0103665 A1* | 4/2016 | Liu | G06F 11/3082 717/158 |
| 2016/0269247 A1* | 9/2016 | Chakradhar | H04L 67/12 |
| 2016/0323348 A1* | 11/2016 | Bradbury | H04L 67/02 |
| 2018/0176193 A1* | 6/2018 | Davis | H04L 9/3247 |
| 2018/0246708 A1* | 8/2018 | Benton | G06F 8/47 |
| 2019/0190852 A1* | 6/2019 | Zhang | G06F 3/06 |

OTHER PUBLICATIONS

Aurora.Apache.org [online] "Aurora System Overview," available on or before Feb. 18, 2018, via Internet Archive: Wayback Machine URL <https://web.archive.org/web/20180218144047/http://aurora.apache.org:80/documentation/latest/getting-started/overview/>, [retrieved on Jan. 11, 2019], retrieved from: URL <http://aurora.apache.org/documentation/latest/getting-started/overview/>, 5 pages.

Blog.Twitter.com [online], "Optimizing Twitter Heron," Mar. 16, 2017, [retrieved on Jan. 10, 2019], retrieved from URL <https://blog.twitter.com/engineering/en_us/topics/open-source/2017/optimizing-twitter-heron.html>, 7 pages.

Fu et al., "Streaming @ Twitter," Bulletin of the IEEE Computer Society Technical Committee on Data Engineering, Dec. 2015, 13 pages.

Kulkarni et al., "Twitter Heron: Stream Processing at Scale," Proceedings of the Association for Computing Machinery (ACM) Special Interest Group in Management of Data (SIGMOD) International Conference on Management of Data, Jun. 2015, pp. 239-250.

Mesos.Apache.org [online], "Mesos Architecture," available on or before Jan. 23, 2018, via Internet Archive: Wayback Machine URL <https://web.archive.org/web/20180123213922/http://mesos.apache.org/documentation/latest/architecture/>, [retrieved on Jan. 11, 2019], retrieved from: URL <http://mesos.apache.org/documentation/latest/architecture/>, 3 pages.

Microsoft.Github.io [online], "Why Bond?" available on or before Mar. 18, 2017 via Internet Archive: Wayback Machine URL <https://web.archive.org/web/20170318153739/http://microsoft.github.io:80/bond/why_bond.html>, [retrieved on Jan. 19, 2019], retrieved from URL <https://microsoft.github.io/bond/why_bond.html#protocols>, 4 pages.

Protocol Buffers [online], "Developer Guide," available on or before Jan. 8, 2018 via Internet Archive: Wayback Machine URL <https://web.archive.org/web/20180108001525/https://developers.google.com/protocol-buffers/docs/overview>, [retrieved on Jan. 11, 2019], retrieved from: URL <https://developers.google.com/protocol-buffers/docs/overview>, 7 pages Thrift.Apache.org [online], "Thrift Network Stack," available on or before Nov. 2, 2017, via Internet Archive: Wayback Machine URL <https://web.archive.org/web/20171102184436/https://thrift.apache.org/docs/concepts>, [retrieved on Jan. 11, 2019], retrieved from URL <https://thrift.apache.org/docs/concepts>, 4 pages.

Zaharia et al., "Discretized Streams: An Efficient and Fault-Tolerant Model for Stream Processing on Large Clusters," Proceedings of the 4th USENIX Conference on Hot Topics in Cloud Computing, Jun. 12-13, 2012, 6 pages.

Zookeeper.Apache.org [online], "ZooKeeper Overview," available on or before Feb. 10, 2018, via Internet Archive: Wayback Machine URL <https://web.archive.org/web/20180210014135/http://zookeeper.apache.org:80/doc/r3.4.11/zookeeperOver.html>, [retrieved on Jan. 11, 2019], retrieved from: URL <https://zookeeper.apache.org/doc/r3.4.13/zookeeperOver.html> 7 pages.

* cited by examiner

REAL-TIME ANALYSIS OF DATA STREAMING OBJECTS FOR DISTRIBUTED STREAM PROCESSING

CROSS-REFERENCE TO RELATED APPLICATIONS

This application claims the benefit under 35 U.S.C. § 119(e) of the filing date of U.S. Patent Application No. 62/471,337, for "Real-Time, Fault-Tolerant, and Distributed Processing of Data Streams," which was filed on Mar. 14, 2017, and which is incorporated here by reference.

BACKGROUND

This specification relates to data stream processing systems.

Conventional data stream processing systems process streams of data, often in real time. In some data stream processing systems, the system provides continuous queries that execute in real time to process particular data streams. For example, a typical data stream processing system may analyze aspects of the data streams to determine real-time trends, real-time conversations, real-time recommendations or real-time search.

SUMMARY

This specification describes technologies for real-time analysis of data streams using a stream processing system. These technologies generally involve techniques for managing the processing of data streams by stream managers including determining whether to process a given data streaming object before deserializing it, processing a data streaming object by modifying the fields of the data stream object in place and perform serialization and/or deserialization of a data streaming object using corresponding code in a memory pool accessible to the stream managers.

In general, one innovative aspect of the subject matter described in this specification can be embodied in data stream processing systems for executing a stream processing job each having a logical topology on a cluster including a plurality of cluster nodes, where the data processing systems include a scheduler that is configured to generate a group of containers for the stream processing job based on the logical topology, wherein the group of containers include a first container and one or more second containers, the first container includes a topology manager that manages the execution of the logical topology on the cluster, each second container of the one or more second containers includes a stream manager and one or more streaming processes, the one or more streaming processes communicate data streaming objects with each other using stream managers, each stream manager is configured to: receive a first data streaming object of the data streaming objects from a first component in the group of containers, determine whether to process the first data streaming object, in response to determining to process the first data streaming object, process the first data streaming object and route the first data streaming object, and in response to determining not to process the first data streaming object, route the first data streaming object.

Other embodiments of this aspect include methods that include performing actions of the scheduler. Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

Other embodiments of this aspect optionally include one or more of the following features. Each stream manager is configured to determine to process the first data streaming object if the first component is a streaming process of the one or more streaming process, and determine not to process the first data streaming object if the first component is another stream manager in the group of containers. Processing the first data streaming object includes modifying one or more fields of the first data streaming object in place. Processing the first data streaming object and routing the first data streaming object in response to determining to process the first data streaming object includes deserializing the first data streaming object to generate a deserialized object; processing the deserialized object to generate a processed object; serializing the processed object to generate a serialized objet; and routing the serializing object. Deserializing the first data streaming object includes accessing a deserialization resource in a memory pool accessible by the stream manager and deserializing the first data streaming object using the deserialization resource. Serializing the processed object includes accessing a serialization resource in a memory pool accessible by the stream manager and serializing the processed object using the serialization resource.

The subject matter described in this specification can be implemented in particular embodiments so as to realize one or more of the following advantages. Data stream processing can be performed faster and with fewer CPU cycles to perform data stream serialization, deserialization, and processing, resulting in greater throughput. Memory used by stream managers for processing data stream objects can be decreased. Kernels supporting data stream processing systems will receive fewer calls from the data stream processing systems. Additionally, improving the stream manager performance directly impacts the overall performance of the topology since it is in the path of all tuple communications. Stream managers avoid repeat serializations by determining whether to process an input object based on the source of the object.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
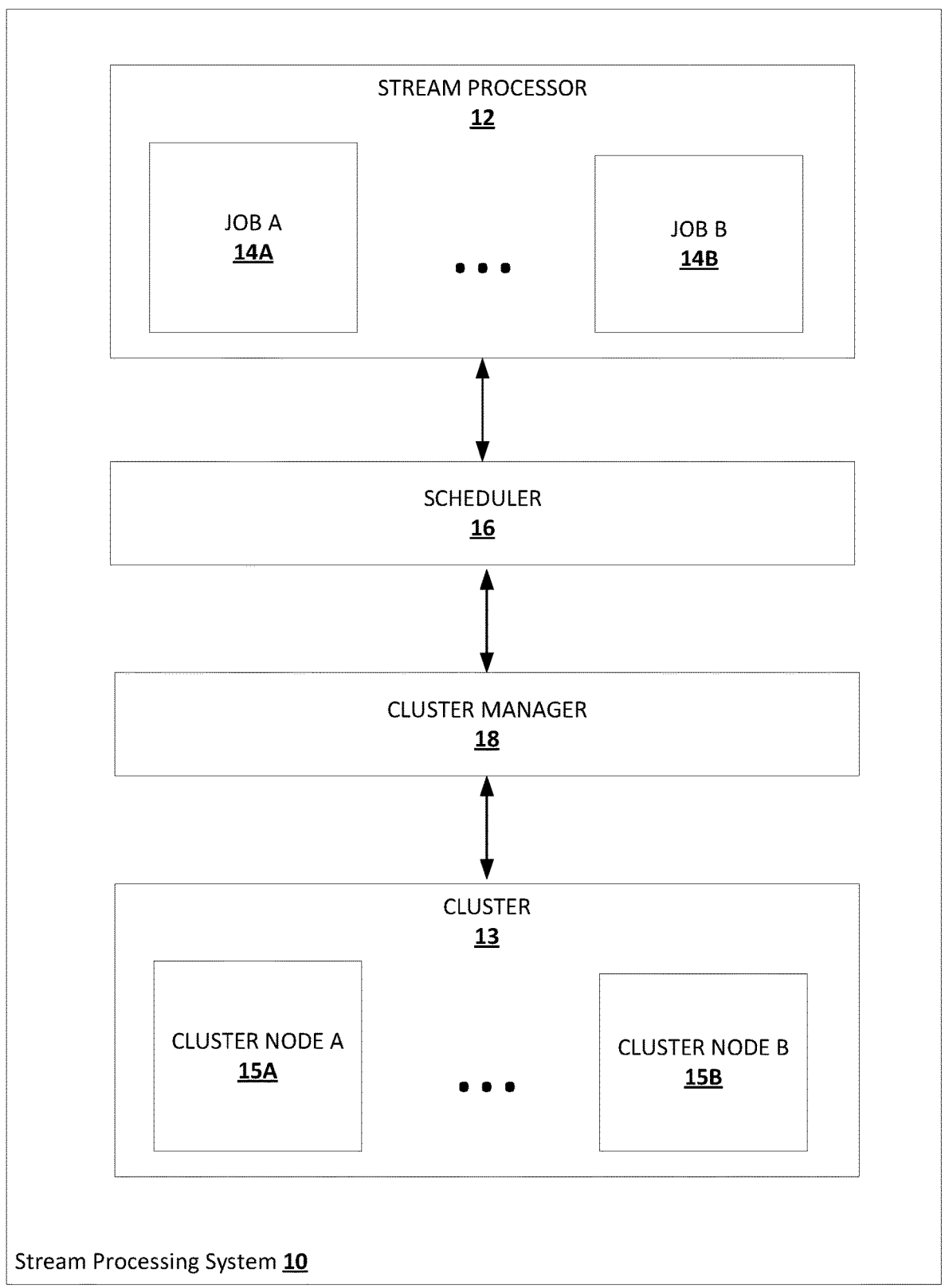
FIG. 1 is an example stream processing system.

FIG. 1 is an example stream processing system 10. The stream processing system 10 is a system of one or more computers that is configured to process one or more streams of data and on which the techniques described in this document can be implemented.

The stream processing system 10 includes a stream processor 12, a scheduler 16, a cluster 13 of computing resources, and a cluster manager 18.

The stream processor 12 obtains a group of stream processing jobs, for example Job A 14A and Job B. The stream processor 12 can obtain stream processing jobs, for example, from a user of the stream processing system 10. Each stream processing job is a group of one or more processing tasks to be performed on a stream of data. An example of a stream processing job is counting a number of active users in a stream of data. Each stream processing job includes a logical topology that describes each processing task in the stream processing job including a type for each processing task and a relationship between the processing tasks. Logical topologies are described in greater detail below with reference to FIG. 2.

The stream processor 12 communicates with the scheduler 16 to execute the stream processing jobs. The scheduler 16 converts a stream processing job having a logical topology to executable units called containers and communicates with the cluster manager 18 to execute the containers in the computing resources of the cluster 13. Each container includes processes that correspond to at least some of the tasks of a logical topology. Containers are explained with greater detail below with reference to FIG. 3.

In some implementations, the scheduler 16 receives offers for available computing resources in the cluster 13 from the cluster manager 18 and requests that the cluster manager 18 execute certain containers on the cluster 13 based on the offered resources and any scheduling constraints in accordance with a scheduling algorithm. An example of a scheduler 16 can be APACHE AURORA. APACHE AURORA is a service scheduler that runs on top of APACHE MESOS, supporting long-running services that take advantage of APACHE MESOS' scalability, fault-tolerance, and resource isolation. Additional information about APACHE AURORA can be found at http://aurora.apache.org/, the contents of which are incorporated here by reference.

The cluster 13 of computing resources includes multiple cluster nodes, for example, cluster node A 15A and cluster node B 15B. The multiple cluster nodes may be local to each other or may be distributed. The cluster manager 18 manages the execution of computer programs, e.g., containers generated by the scheduler 16, on the cluster nodes.

An example of a cluster manager 18 is APACHE MESOS. APACHE MESOS is a cluster manager that simplifies the running of applications on a shared pool of computing resources, e.g., servers, while providing efficient resource isolation and sharing across distributed applications or frameworks. Representative frameworks include APACHE HADOOP, APACHE STORM, and RUBY ON RAILS. In operation, APACHE MESOS takes a heterogeneous collection of computing resources and allocates those resources using a distributed scheduling mechanism called resource offers. APACHE MESOS decides how many resources to offer each framework, while the frameworks decide which resources to accept and which computations to run on them. APACHE MESOS is, therefore, a thin resource sharing layer that enables fine-grained sharing across diverse cluster computing frameworks, by giving frameworks a common interface for accessing cluster resources. Additional information about APACHE MESOS can be found at http://mesos.apache.org/, the contents of which are incorporated here by reference.

The stream processing system 10 can include additional components that provide services to one or more of the components of the stream processing system 10, manage one or more of those components, and/or provide interfaces for communication between two or more of those components. For example, in some implementations, the stream processing system 10 includes a distributed coordination service that (among other things) allows the scheduler 16 to lock a computing resource in the cluster 13 while using the computing resource to avoid conflicting use of the resource by other schedulers. A distributed coordination service can offer different services to the cluster. For example, the distributed coordination service can provide a location to store information about the cluster, such as the location of masters and schedulers. In another example, the distributed coordination service can provide a distributed lock service used by the scheduler 16 to implement leader election when there is more than one scheduler 16 running at the same time. In one example approach, multiple distributed coordination services run at the same time, and all work together to provide these services. An example distributed coordination service is APACHE ZOOKEEPER. Additional information about APACHE ZOOKEEPER can be found at https://zookeeper.apache.org/, the contents of which are incorporated here by reference.

The resulting outputs of the stream processing jobs can be provided as other inputs within the stream processing system or externally. For example, in a social networking platform, real-time streams being processed by the stream processing system can include, for example computing real-time active user counts or computing real-time engagement with message content on the social networking platform. The results can be used, for example, to update the visualizations of the engagements in a graphical user interface provide to users of the social networking platform. For example, when a user views a message on the social networking platform, the engagement counts can be updated based on the stream computations. Other stream processing jobs can be used to generate outputs used to determine real-time trends, real-time conversations, real-time recommendations or real-time search that can then be provided for presentation to one or more users, e.g., in response to a request such as a search query.

Figure 2:
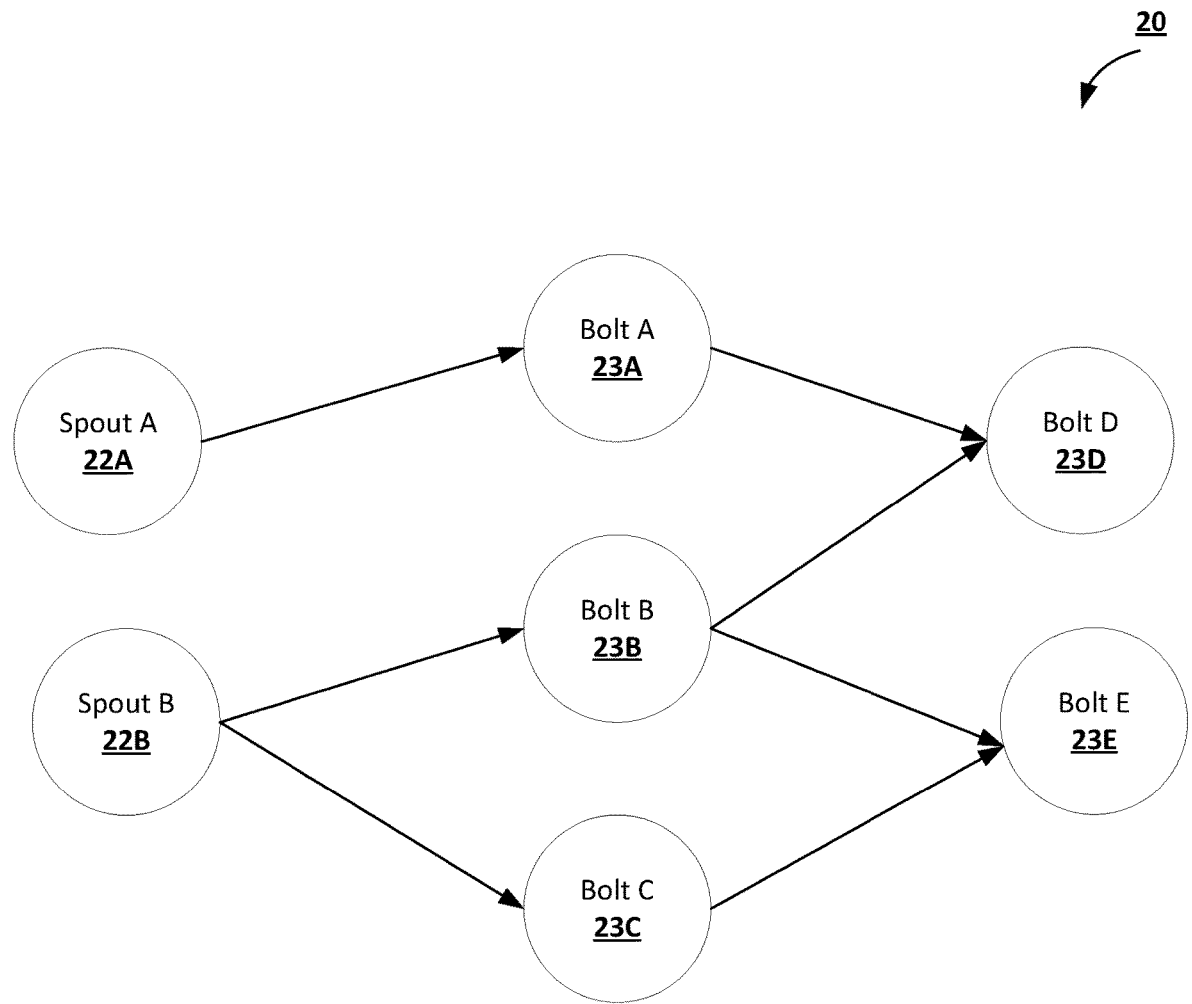
FIG. 2 is an example logical topology for a stream processing job.

FIG. 2 is an example logical topology 20 for a stream processing job. The logical topology 20 is a directed acyclic graph representing computation of the job. Each node in the logical topology contains processing logic and the links between the nodes indicate how the data flows between them. These data flows can be referred to as data streams. In some implementations, a data stream is an unbounded sequence of tuples. Nodes take one or more data streams and transform them into one or more new data streams. The logical topology includes two types of nodes: spouts and bolts. A spout is a source of a data stream. A bolt consumes tuples from data streams, applies its processing logic, and emits tuples in outgoing data streams. In one example approach, a bolt processes any number of input streams and produces any number of new output streams. Some example processing logic performed by bolts includes functions, filters, streaming joins, streaming aggregations, or database queries.

A spout can obtain a data stream from a particular source, e.g., from a queuing broker such as Kestrel, RabbitMQ, or Kafka and/or by generating the data streams but a spout can also generate its own stream or read from another location, e.g., a streaming API. Spouts generate input tuples that are fed into each topology. For example, a Kafka spout can tap into a particular Kafka queue and emit it as a data stream to one or more designated bolts.

The logical topology 20 includes spout A 22A that provides data streams to bolt A 23A and spout B 22B that provides data streams to bolt B 23B and bolt C 23C. Bolt A 23A and bolt B 23B provide processed data streams to bolt D 23D, while bolt B 23B and 23C provide processed data streams to bolt E 23E.

In one example approach, each topology is a directed acyclic graph of spouts and bolts, with each edge in the graph representing a bolt subscribing to the output stream of some other spout or bolt. A topology may be an arbitrarily complex multi-stage stream computation. Topologies can run indefinitely when deployed.

In one example approach, a stream processor runs topologies within a framework on top of a cluster manager. Spouts generate input tuples that are fed into the topology, and bolts do the actual computation. In some implementations, each specific topology is equivalent to a logical query plan in a database system. Such a logical plan is translated into a physical plan before actual execution. As a part of the topology, a programmer can specify the number of tasks for each spout and each bolt (i.e. the degree of parallelism), and how the data is partitioned as it moves across the spout and the bolt tasks (grouping). The actual topology, parallelism specification for each component, and the grouping specification, constitute the physical execution plan that is executed on the machines.

In one such example approach, the stream processor uses tuple processing semantics that include:
  At most once—No tuple is processed more than once, although some tuples may be dropped, and thus may miss being analyzed by the topology.
  At least once—Each tuple is guaranteed to be processed at least once, although some tuples may be processed more than once, and may contribute to the result of the topology multiple times.

Figure 3:
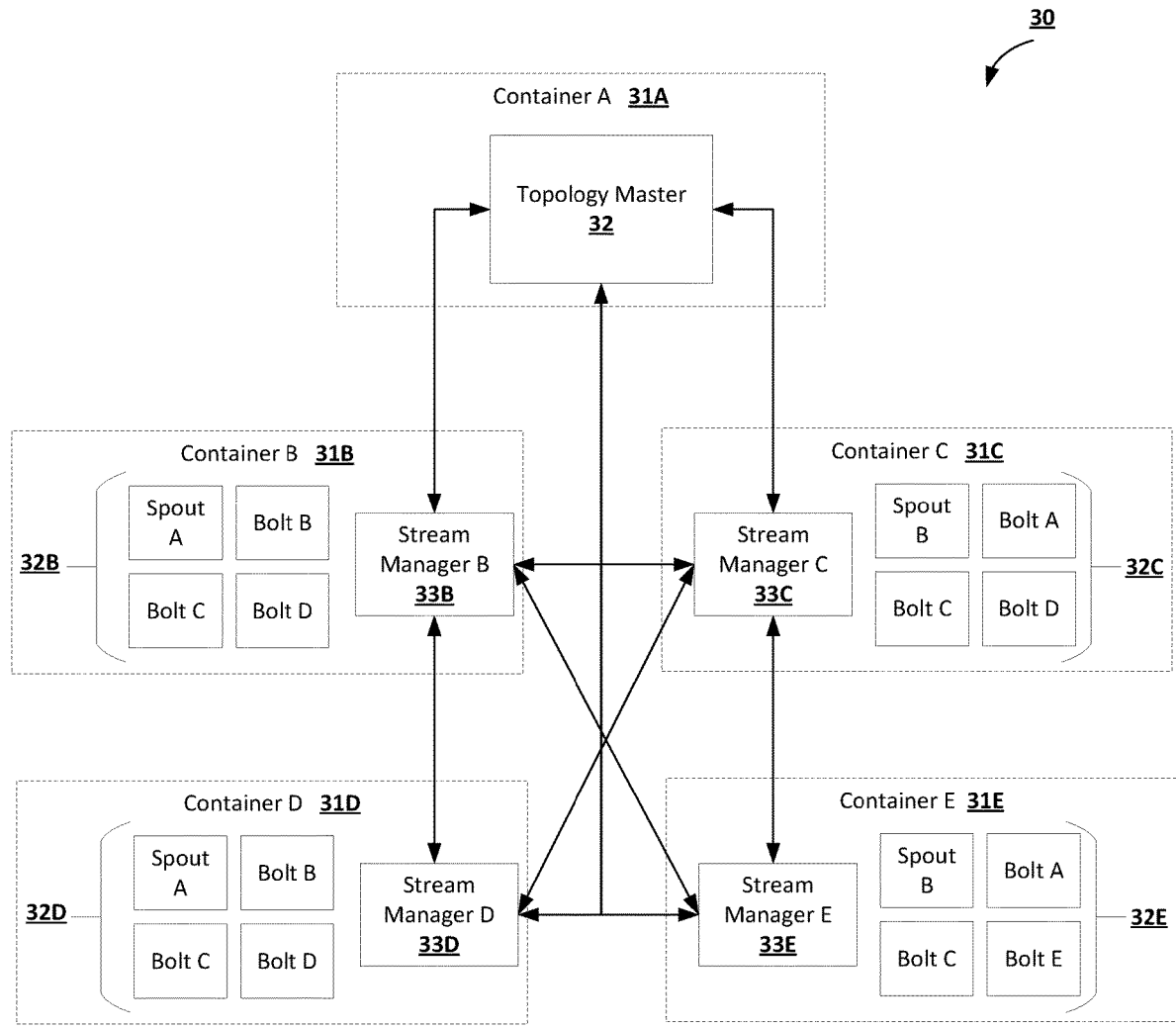
FIG. 3 is a diagram illustrating an example group of containers for execution of a logical topology.

FIG. 3 is a diagram illustrating an example group of containers 30 for execution of a logical topology. The containers 30 include a first container, container 31A, that includes a topology master 32. The topology master 32 manages the execution of the logical topology using the containers 30. For example, the topology master 32 can be a point of contact for discovering a status of an execution of the logical topology. Moreover, the topology master 32 can be an interface that allows processes executing the logical topology to discover the logical topology and the containers 30.

In some implementations, upon startup, the topology master 32 makes itself discoverable by creating an ephemeral node at a well-known location in the distributed coordination service. The ephemeral node can prevent multiple topology masters from becoming the master for the same topology, thereby providing different processes of the topology a consistent view of the entire topology. The ephemeral node can also allow other processes that belongs to the topology to discover the topology master 32.

The topology master 32 also serves as a gateway for the topology metrics through an endpoint. As illustrated, since the topology master is not involved in the data processing path, it is not a bottleneck. In some example approaches, a standby topology master can be swapped in to replace the current topology master as necessary based on state saved in the distributed coordination service.

The containers 30 further include a group of second containers, containers 31B-E. Each container of the second containers includes a stream manager, stream managers 33B-E for the containers 31B-E, respectively, and a group of streaming processes, groups 32B-E for the containers 31B-E, respectively.

A streaming process in a second container performs a task that corresponds to a defined task, e.g., a spout or a bolt, in the logical topology. A streaming process in a second container communicates with other streaming processes in the same container or a different container to perform communications between the tasks defined by the logical topology.

To transmit a data streaming object to a destination streaming process, a source streaming process directs the object to a stream manager of the container that includes the source streaming process. The stream manager routes the data streaming object to the destination streaming process. If the destination streaming process is in the same container as the stream manager, the stream manager routes the object to the destination streaming process. If the destination streaming process is in a different container than the stream manager, the stream manager routes the object to the stream manager of the container that includes the destination streaming process. The stream manager of the container that includes the destination streaming process then routes the object to the destination streaming process.

One key function of a given stream manager is to manage the routing of tuples efficiently. Each streaming process can connect to its local stream manager to send and receive tuples. All stream managers 40 in a topology connect between themselves to form a O(k2) connection network, where k is the number of containers/stream manager in the physical plan of the topology. The number of streaming processes, n, is generally much larger than k, this design permits a way to scale the communication overlay network by multiplexing O(n2) logical channels over O(k2) physical connections. Furthermore, any tuples routed from one streaming process to another streaming process in the same container can be routed using a local short-circuiting mechanism.

Figure 4:
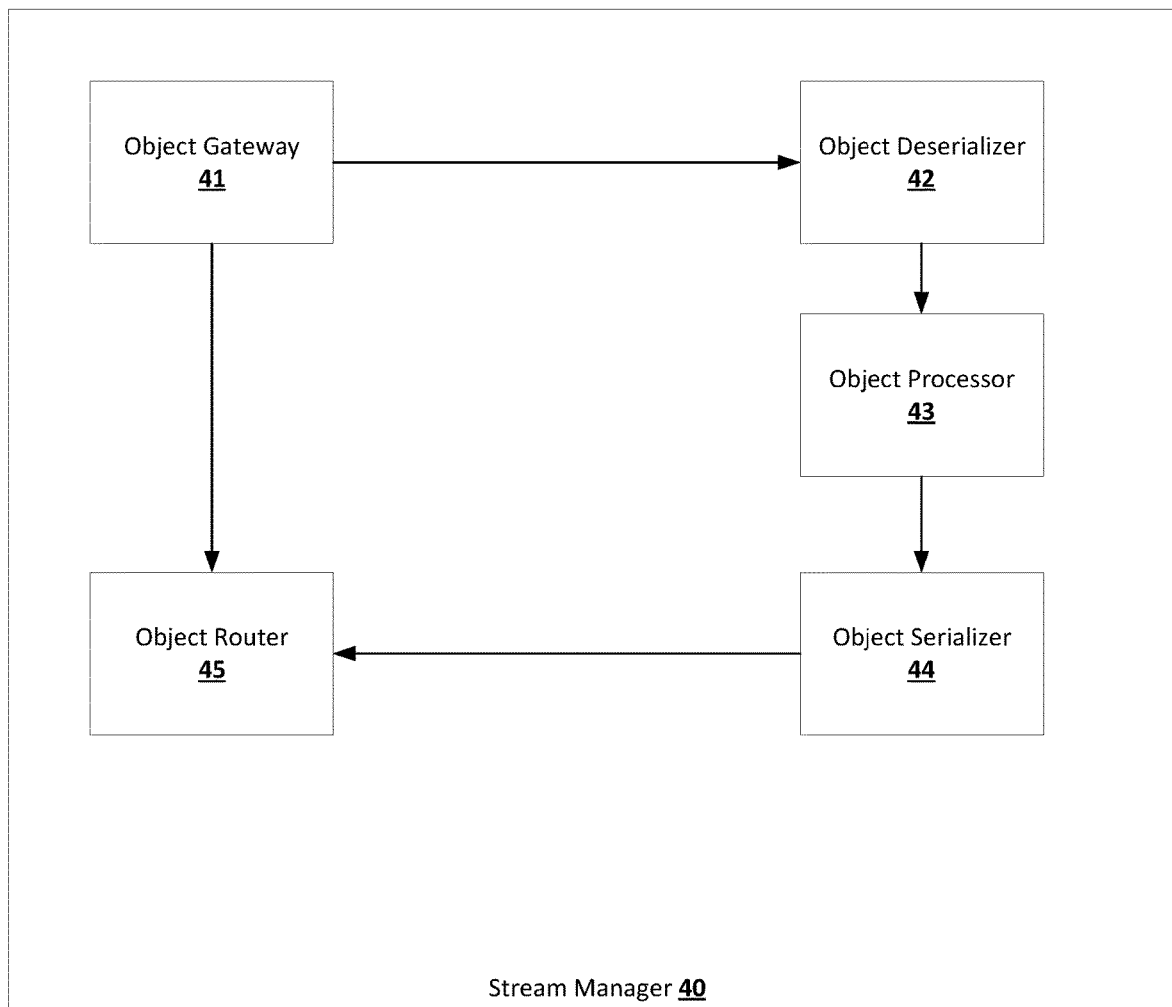
FIG. 4 is a diagram illustrating example components for routing data streams between streaming processes in an example stream manager.

FIG. 4 is a diagram illustrating examples components for routing data streams between streaming processes in an example stream manager 40. The stream manager 40 includes an object gateway 41, an object deserializer 42, an object processor 43, an object serializer 44, and an object router 45.

The object gateway 41 receives a data streaming object. The object gateway 41 also determines whether the stream manager 40 should process the object. If the object gateway 41 determines that the stream manager 40 should process the object, the object gateway 41 sends a signal to the object deserializer 41 to deserialize the object. If the object gateway 41 determines that the stream manager 40 should not process the object, the object gateway 41 sends a signal to the object router 45 to route the object.

The object deserializer 42 deserializes the data streaming object. Streaming processes and stream manager transmit data streaming objects in a serialized form. Therefore, to perform processing on the object, the stream manager 40 needs to first deserialize the object using the object deserializer 42. When the object deserializer 42 finishes deserializing the object, the object deserializer 42 sends a signal to the object processor 43 to process the object.

The object processor 43 processes the data streaming object. Processing the data streaming object can include changing the format of the object and/or one or more fields of the data streaming object. For example, the object processor 43 can change an identifier or header field of the data streaming object in accordance with a processing algorithm. Fields of a data streaming object are explained in greater detail below with reference to FIG. 5.

When the object processor 43 finishes processing the data streaming object, the object processor 43 sends a signal to the object serializer 44 to serialize the object. The object serializer 44 then serializes the object for transmission to a destination streaming process or stream manager. When the object serializes 44 finishes serializing the object, the object serializer 44 sends a signal to the object router to route the object to a streaming process or a stream manager.

Figure 5:
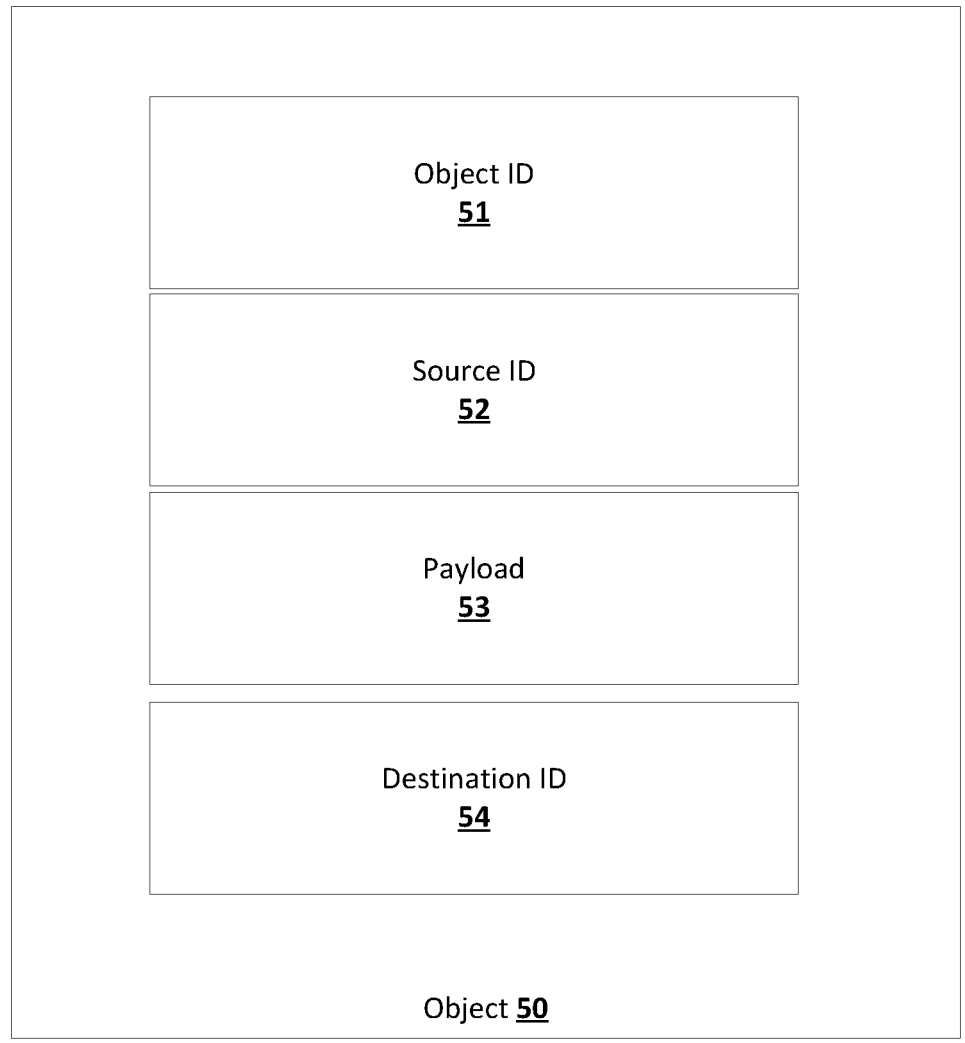
FIG. 5 is a diagram illustrating an example data stream object.

FIG. 5 is a diagram illustrating an example data streaming object 50. The object 50 includes an object identifier 51 that is a unique identifier of the object 50, a source identifier 52 that identifies the streaming process from which the object 50 originates, a payload 53 that includes the stream processing data of the object 50, and a destination identifier 54 that identifies the intended destination streaming process for the object 50.

To process the data streaming object 50, a stream manager, e.g., stream manager 40 of FIG. 4, may need to modify one or more fields of the object 50, such as the object identifier 51 of the object 50. In some implementations, the stream manager changes the format of the object, e.g., by batching the object with one or more other data streaming objects, and updates the object identifier to a new unique identifier for the changed object.

Figure 6:
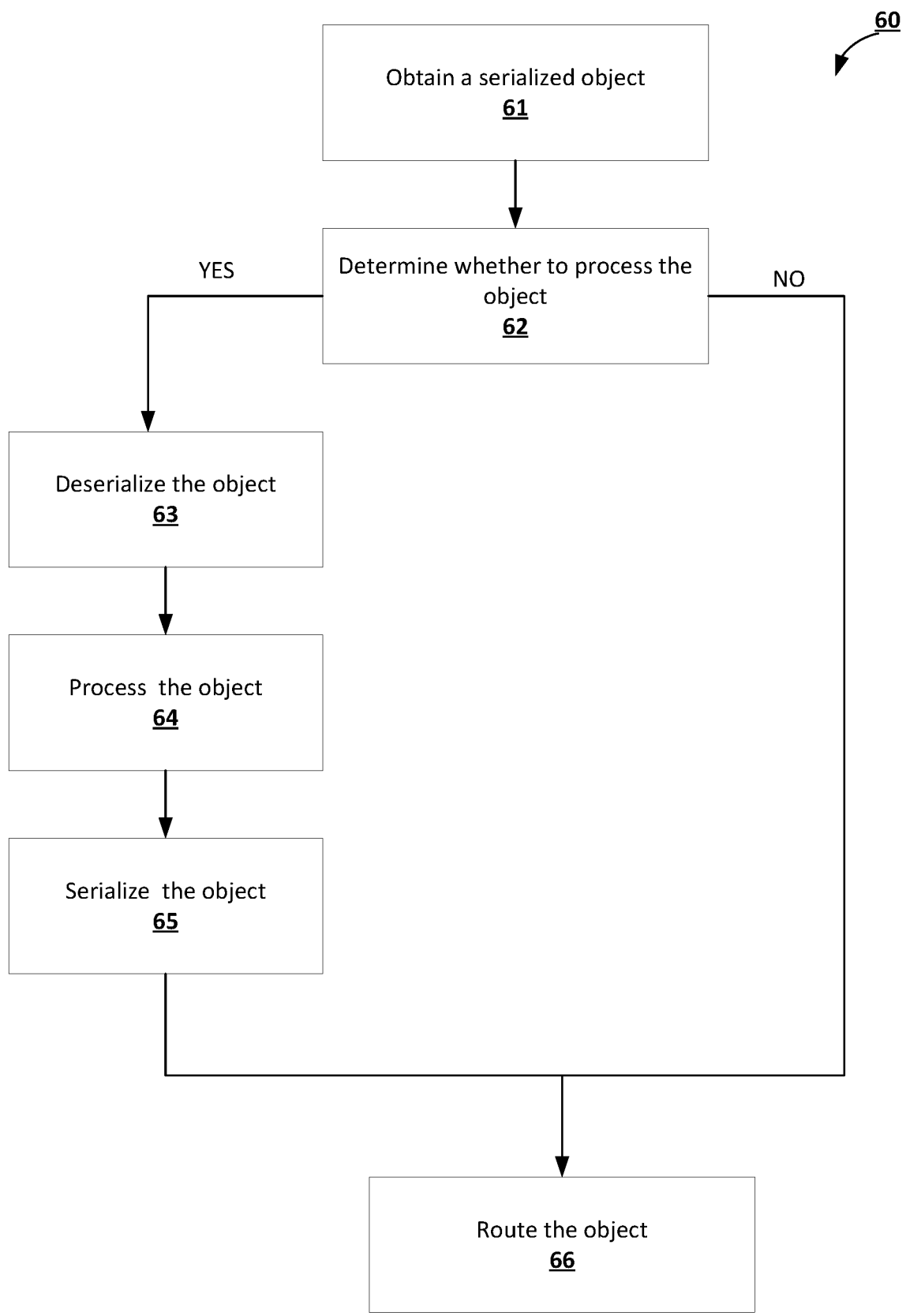
FIG. 6 is a flowchart of an example process for handling data stream objects.

FIG. 6 is a flowchart of an example process 60 for handing data streaming objects. The process 60 can be performed by a stream manager, e.g., the stream manager 40 of FIG. 4. The stream manager obtains a serialized data streaming object (61) and determines whether to process the object (62). If the stream manager determines to process the object, the stream manager deserializes the serialized object (63), processes the deserialized object (64), and serializes the processed object (65) before routing the serialized object to a destination. If the stream manager determines not to process the object, the stream manager simply routes the serialized object (65) to the destination.

In some steam processing systems, a stream manager deserializes every serialized data streaming object that the stream manager obtains. Such an eager deserialization is costly because deserializing an object consumes significant computational resources. By performing deserialization only in situations in which the stream manager determines it needs to process an object, a stream manager can reduce the amount of processing required to perform its processing and routing tasks.

Determining whether to process a data streaming object is described in greater detail below with reference to FIG. 7. Serializing or deserializing an object is described in greater detail below with reference to FIG. 8. Processing an object is described in greater detail below with reference to FIG. 9.

Figure 7:
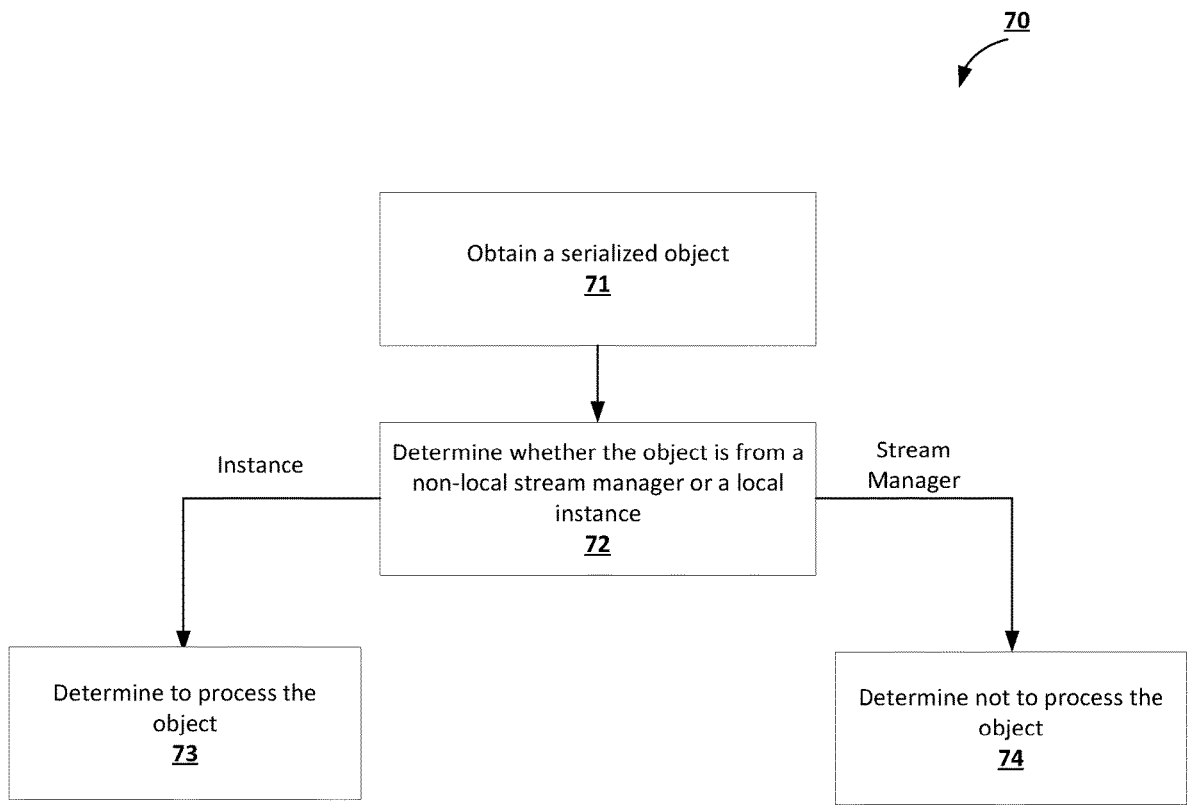
FIG. 7 is a flowchart of an example process for determining whether to process a data streaming object.

FIG. 7 is a flowchart of an example process 70 for determining whether to process a data streaming object. The process 70 can be performed by a stream manager, e.g., the stream manager 40 of FIG. 4.

The stream manager obtains a serialized data streaming object (61) and determines whether it has received the object from a streaming process local to the stream manager or another stream manager from a different container (62). In some implementations, the stream manager determines the source of the object from one or more fields of the object, such as a header or identifier field of the object.

If the stream manager determines that it has received the object from a local process, the stream manager will determine to process the object (63). This is because the stream manager assumes that the object has not previously been transmitted to a stream manager where the object could have been processed.

When a stream manager processes a data streaming object, it typically changes the format or contents of the object in accordance with a processing algorithm and generates a new unique identifier for the changed object. After processing, the changed object is in a format acceptable to stream managers and as such does not typically need to be re-processed by any future stream manager that receives and routes the object.

However, if the stream manager determines that it has received the data streaming object from a non-local stream manager, the stream manager will determine not to process the object (64). This is because the stream manager assumes that the object has previously been processed at the non-local stream manager.

Figure 8:
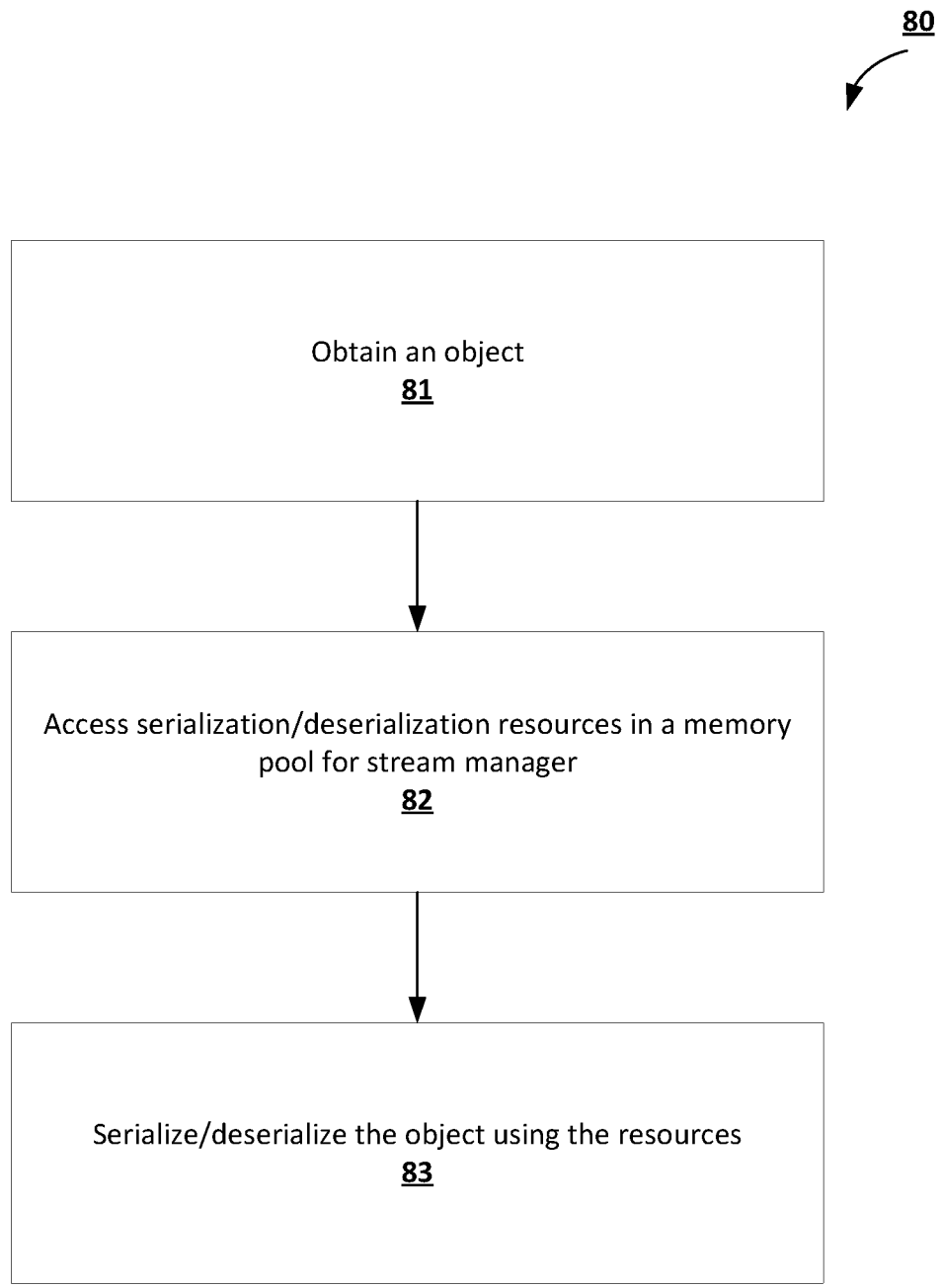
FIG. 8 is a flowchart of an example process for serializing or deserializing a data streaming object.

FIG. 8 is a flowchart of an example process 80 for serializing or deserializing a data streaming object. The process 80 can be performed by a stream manager, e.g., the stream manager 40 of FIG. 4.

The stream manager obtains a data streaming object (81) and accesses serialization or deserialization resources in a memory pool accessible by the stream manager (82).

Computer programs, e.g., streaming processes in containers, communicate with each other through serialized data. Serialization refers to the process of converting data to a format that is understandable by two or more computer programs. In some implementations, serialization can refer to converting data to a language-neutral format such as the extensible mark-up language (XML). Computer programs written in different programming languages can then communicate data in a language-neutral format to each other.

A source computer program serializes the data by converting it to a serialized format using a serialization resource, e.g., an instance of a serialization program. The destination computer program deserializes the serialized format by converting it to a programming language of the destination computer program using a deserialization resource, e.g., an instance of a deserialization program. Examples of serialization and deserialization computer programs include data conversion programs associated with Google's PROTOCOL BUFFERS, APACHE THRIFT, and MICROSOFT BOND. Additional information about PROTOCOL BUFFERS can be found at https://developers.google.com/protocol-buffers/docs/overview, the contents of which are incorporated here by reference. Additional information about APACHE THRIFT can be found at https://thrift.apache.org/, the contents of which are incorporated here by reference. Additional information about MICROSOFT BOND can be found at https://microsoft.github.io/bond/why_bond.html#protocols, the contents of which are incorporated here by reference.

A memory pool is a segment of computer memory. The stream manager or some other component of a data stream processing system that includes the stream manager can cache serialization and deserialization resources in the memory pool. Without caching those resources in the memory pool, the stream manager may have to first obtain memory allocation for the resources and load the resources into allocated memory resources. When a serialization or deserialization resource is cached in a memory pool, the stream manager can avoid such memory allocation and loading tasks, which saves processing time and cycles.

The stream manager serializes or deserializes the object uses the corresponding resources (83). In some stream processing systems, a stream manager does not have access to the serialization or deserialization resources. As a result, to perform serialization or deserialization, the stream manager has to make calls to a third-party component, e.g., a kernel or operating system that manages memory resources to allocate memory resources to serialization or deserialization resources. Such calls can increase processing time. By directly accessing serialization or deserialization resources, a stream manager can perform serialization or deserialization tasks more efficiently.

Figure 9:
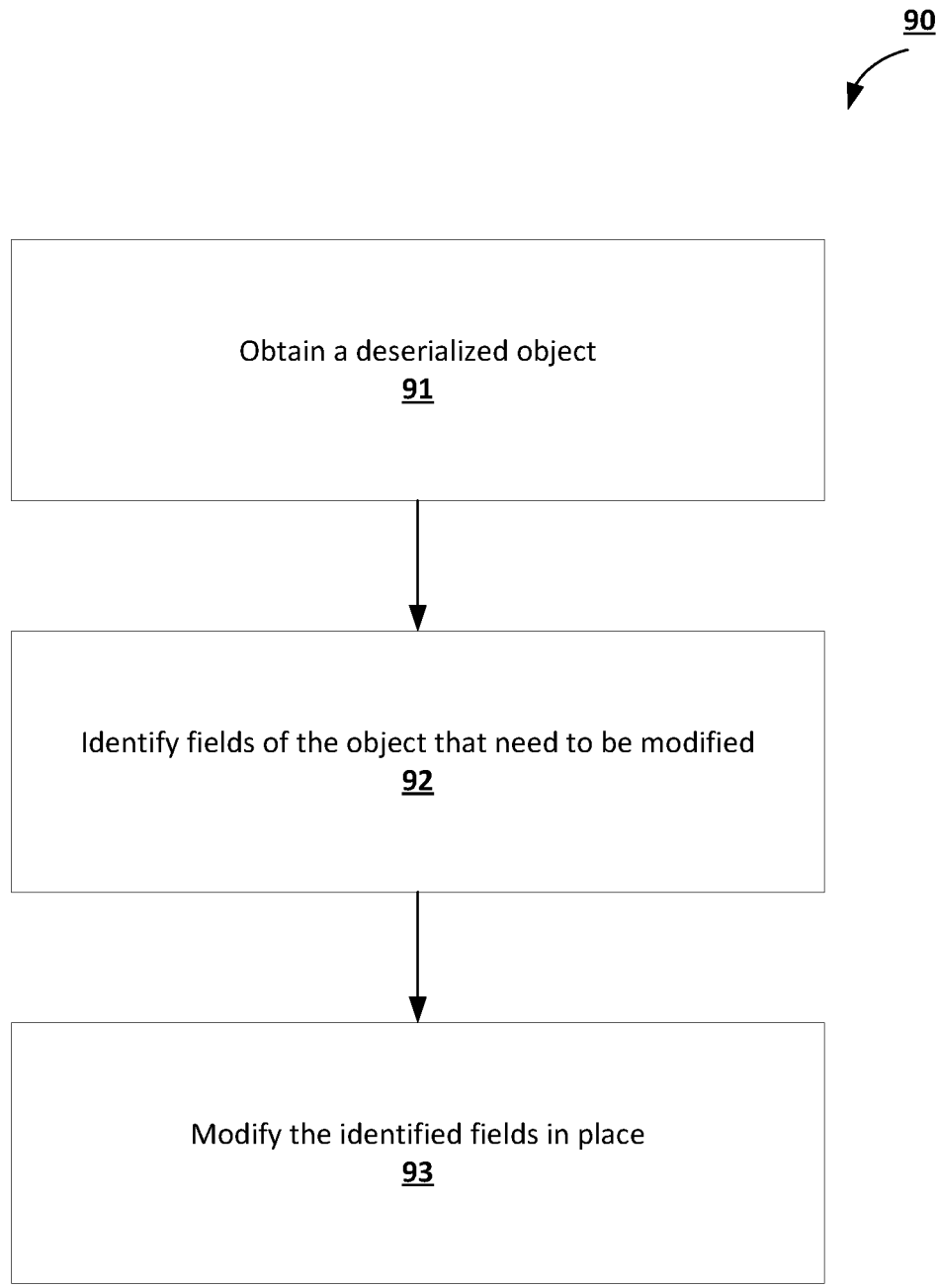
FIG. 9 is a flowchart of an example process for processing a data streaming object.

FIG. 9 is a flowchart of an example process 90 for processing a data streaming object. The process 90 can be performed by a stream manager, e.g., the stream manager 40 of FIG. 4. The stream manager obtains a data streaming object (91), determines fields of the object that need to be modified to process the object, and modifies those fields in place to perform processing.

In some stream processing systems, a stream manager does not perform object modification in place. Instead, the stream manager may copy the object into a new location. This requires a copy operation, an object allocation operation for the new object, and an object deallocation operation for the old object in addition to the operations needed to modify the new object. By modifying a data stream object in place, the stream manager can avoid performing copy, allocation, and deallocation operations and thus perform object processing more efficiently.

Additional examples of stream processing systems including techniques for containerized stream processing can be found, for example, in U.S. patent application Ser. No. 15/069,893, for Stream Processing at Scale, filed on Mar. 14, 2016, which is incorporated here by reference.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative, functional, or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A data stream processing system for executing a stream processing job having a logical topology on a cluster that includes a plurality of cluster nodes, the data stream processing system comprising:

a scheduler that is configured to generate a group of containers for the stream processing job based on the logical topology, wherein:

the group of containers includes a first container and one or more second containers, the first container includes a topology master that manages the execution of the logical topology on the cluster, wherein the logical topology comprises one or more spouts and one or more bolts, wherein each spout represents a source of a respective data stream that provides data streaming objects of the respective data stream to one or more bolts, and wherein each bolt represents operations comprising processing one or more data streaming objects, each second container of the one or more second containers includes a stream manager and one or more streaming processes, wherein each streaming process corresponds to a respective spout or bolt of the logical topology, the one or more streaming processes communicate data streaming objects with each other using stream managers, and the stream manager of each second container is configured to:

receive a first data streaming object from a first component in the group of containers;

determine if the first component is a streaming process of the same local second container or if the first component is the stream manager of a non-local second container in the group of containers;

in response to determining that the first component is a streaming process of the same local second container, process the first data streaming object and route the processed first data streaming object to one or more of a non-local second container in the group of containers or a different streaming process of the same local second container; and in response to determining that the first component is the stream manager of a non-local second container in the group of containers, route the first data streaming object, without processing the first data streaming object, to a streaming process of the same local container.

2. The data stream processing system of claim 1, wherein processing the first data streaming object comprises modifying one or more fields of the first data streaming object in place.

3. The data stream processing system of claim 1, wherein processing the first data streaming object and routing the first data streaming object in response to determining to process the first data streaming object comprises:

deserializing the first data streaming object to generate a deserialized object;

processing the deserialized object to generate a processed object;

serializing the processed object to generate a serialized objet; and routing the serialized object.

4. The data stream processing system of claim 3, wherein deserializing the first data streaming object comprises accessing a deserialization resource in a memory pool accessible by the stream manager and deserializing the first data streaming object using the deserialization resource.

5. The data stream processing system of claim 3, wherein serializing the processed object comprises accessing a serialization resource in a memory pool accessible by the stream manager and serializing the processed object using the serialization resource.

6. The data stream processing system of claim 1, wherein routing the first data streaming object to a non-local second container in the group of containers comprises routing the first data streaming object to the stream manager of the non-local second container.

7. A method performed by a stream manager of a particular container in a group of containers that each include one or more streaming processes and a stream manager, wherein:

the group of containers is configured to execute a stream processing job having a logical topology that comprises one or more spouts and one or more bolts, wherein each spout represents a source of a respective data stream that provides data streaming objects of the respective data stream to one or more bolts, and each bolt represents operations comprising processing one or more data streaming objects, and each streaming process corresponds to a respective spout or bolt of the logical topology, the method comprising:

receiving a first data streaming object from a first component in the group of containers;

determining if the first component is a streaming process of the same local container or if the first component is the stream manager of a non-local container in the group of containers;

in response to determining that the first component is a streaming process of the same local container, processing the first data streaming object and routing the processed first data streaming object to one or more of a non-local container in the group of containers or a different streaming process of the same local container; and in response to determining that the first component is the stream manager of a non-local container in the group of containers, routing the first data streaming object, without processing the first data streaming object, to a streaming process of the same local container.

8. The method of claim 7, wherein processing the first data streaming object comprises modifying one or more fields of the first data streaming object in place.

9. The method of claim 7, wherein processing the first data streaming object and routing the first data streaming object in response to determining to process the first data streaming object comprises:

deserializing the first data streaming object to generate a deserialized object;

processing the deserialized object to generate a processed object;

serializing the processed object to generate a serialized objet; and routing the serialized object.

10. The method of claim 9, wherein deserializing the first data streaming object comprises accessing a deserialization resource in a memory pool accessible by the stream manager and deserializing the first data streaming object using the deserialization resource.

11. The method of claim 9, wherein serializing the processed object comprises accessing a serialization resource in a memory pool accessible by the stream manager and serializing the processed object using the serialization resource.

12. The method of claim 7, wherein routing the first data streaming object to a non-local container in the group of containers comprises routing the first data streaming object to the stream manager of the non-local container.

13. The method of claim 7, wherein the group of containers is a group of second containers, wherein each second container in the group of second containers is communicatively linked to a first container, and wherein the first container includes a topology master that manages the execution of the logical topology.

14. One or more non-transitory computer storage media encoded with computer program instructions that when executed by one or more computers cause the one or more computers to perform operations comprising:

receiving, at a stream manager of a particular container in a group of containers that each include one or more streaming processes and a stream manager, a first data streaming object from a first component in the group of containers, wherein the group of containers is configured to execute a stream processing job having a logical topology that comprises one or more spouts and one or more bolts, wherein each spout represents a source of a respective data stream that provides data streaming objects of the respective data stream to one or more bolts, and each bolt represents operations comprising processing one or more data streaming objects, and each streaming process corresponding to a respective spout or bolt of the logical topology;

determining if the first component is a streaming process of the same local container or if the first component is the stream manager of a non-local container in the group of containers;

in response to determining that the first component is a streaming process of the same local container, processing the first data streaming object and routing the processed first data streaming object to one or more of a non-local container in the group of containers or a different streaming process of the same local container; and in response to determining that the first component is the stream manager of a non-local container in the group of containers, routing the first data streaming object, without processing the first data streaming object, to a streaming process of the same local container.

15. The one or more non-transitory computer storage media of claim 14, wherein processing the first data streaming object comprises modifying one or more fields of the first data streaming object in place.

16. The one or more non-transitory computer storage media of claim 14, wherein processing the first data streaming object and routing the first data streaming object in response to determining to process the first data streaming object comprises:
   deserializing the first data streaming object to generate a deserialized object;
   processing the deserialized object to generate a processed object;
   serializing the processed object to generate a serialized objet; and
   routing the serialized object.

17. The one or more non-transitory computer storage media of claim 16, wherein deserializing the first data streaming object comprises accessing a deserialization resource in a memory pool accessible by the stream manager and deserializing the first data streaming object using the deserialization resource.

18. The one or more non-transitory computer storage media of claim 16, wherein serializing the processed object comprises accessing a serialization resource in a memory pool accessible by the stream manager and serializing the processed object using the serialization resource.

19. The one or more non-transitory computer storage media of claim 14, wherein routing the first data streaming object to a non-local container in the group of containers comprises routing the first data streaming object to the stream manager of the non-local container.

20. The one or more non-transitory computer storage media of claim 14, wherein the group of containers is a group of second containers, wherein each second container in the group of second containers is communicatively linked to a first container, and wherein the first container includes a topology master that manages the execution of the logical topology.

* * * * *